United States Patent [19]

Tozu et al.

[11] Patent Number: 5,390,991
[45] Date of Patent: Feb. 21, 1995

[54] ANTI-SKID CONTROL SYSTEM

[75] Inventors: Kenji Tozu; Kenji Asano; Hiroaki Kawai, all of Aichi, Japan

[73] Assignee: Aisin Seiki Kabushiki Kaisha, Kariya, Japan

[21] Appl. No.: 951,736

[22] Filed: Sep. 28, 1992

[30] Foreign Application Priority Data

Sep. 26, 1991 [JP] Japan .................. 3-247996

[51] Int. Cl.$^6$ .................................... B60T 8/60
[52] U.S. Cl. ............................ 303/97; 303/100; 303/105; 303/22.1
[58] Field of Search .................. 303/93–95, 303/100, 103, 104, 105, 9.69, 22.1, 113.1, 113.2, 97; 180/197; 364/426.01, 426.02, 426.03

[56] References Cited

U.S. PATENT DOCUMENTS

| | | | |
|---|---|---|---|
| 3,609,313 | 9/1971 | Lucien | 303/93 X |
| 3,614,173 | 10/1971 | Branson | 303/93 |
| 4,398,260 | 8/1983 | Takahashi et al. | 303/93 X |
| 4,530,059 | 7/1985 | Brearley et al. | 303/97 X |
| 4,718,735 | 1/1988 | Ogino | 303/103 X |
| 4,778,223 | 10/1988 | Inoue | 303/100 |
| 4,779,696 | 10/1988 | Harada et al. | 180/197 |
| 5,065,327 | 11/1991 | Yahagi et al. | 364/426.02 |
| 5,148,368 | 9/1992 | Okubo | 364/426.02 |

FOREIGN PATENT DOCUMENTS

154947 8/1985 Japan .
31554 2/1987 Japan .

*Primary Examiner*—Robert J. Oberleitner
*Assistant Examiner*—Peter M. Poon
*Attorney, Agent, or Firm*—Sughrue, Mion, Zinn, Macpeak & Seas

[57] ABSTRACT

An anti-skid control system for use in an automotive vehicle is comprises of a real slip rate detecting device for detecting a real slip rate of the vehicle, a target slip rate setting device for setting a target slip rate of the vehicle, a braking force control device for adjusting a braking force in such a manner that a deviation between the real slip rate and the target slip rate becomes zero, a load measuring device for measuring a load applied to the vehicle, an correcting device for adding a value to the control device which is the product of a coefficient and the deviation between the real slip rate and the target slip rate and a coefficient adjusting device for decreasing the coefficient as the load decreases. If the load decreases during the vehicle's travel, the coefficient to be multiplied to the deviation between the real slip rate and the target slip rate decreases. Thus the quantity to be subtracted from the braking force is decreased and the current braking force is hardly reduced.

20 Claims, 9 Drawing Sheets

53 : CALCULATING DIVISION
54 : ROAD-SURFACE CONDITION RECOGNITION DIVISION
55 : INITIATION/TERMINATION OF CONTROL RECOGNITION DIVISION
56 : MOTOR CONTROL DIVISION
57 : TARGET SLIP RATE CALCULATING DIVISION
58 : SLIP RATE COMPONENT CALCULATING DIVISION
59 : G-COMPONENT CALCULATING DIVISION
60 : CONTROL MODE SETTING DIVISION
61 : SOLENOID CONTROL DIVISION
83 : LOAD INVALIDATION PROCESSING DIVISION
84 : LOAD INVALIDATION PROCESSING DIVISION

22a : MOTOR
23 : CONTROL UNIT
32 : ELECTROMAGNETIC VALVE
33 : ELECTROMAGNETIC VALVE
34 : ELECTROMAGNETIC VALVE
35 : ELECTROMAGNETIC VALVE
36 : ELECTROMAGNETIC VALVE
37 : ELECTROMAGNETIC VALVE
38 : ELECTROMAGNETIC VALVE
39 : ELECTROMAGNETIC VALVE
48 : VEHICLE SPEED SENSOR
50 : YAW RATE SENSOR
51 : ACCELERATION SENSOR
52 : LOAD SENSOR
62 : BRAKE SWITCH
68 : ACCELERATION SWITCH
69 : IDLING SWITCH

ANTI-SKID CONTROL SYSTEM

BACKGROUND OF THE INVENTION

The present invention relates to an anti-skid control system for use in an automotive vehicle, and in particular to an anti-skid control system in which the degree of a locking condition of each road-wheel is restricted.

An anti-lock braking device has been developed for reducing the braking distance by the prevention of the locked condition of each road-wheel. In addition, a traction control device also has been developed in order to improve the acceleration performance of the vehicle by preventing the slip upon initiation of a rapid acceleration. In each device, the prevention of the slip between each road-wheel and a road surface is attained by adjusting the braking force, which is to be applied to the road-wheel, taking into consideration the deceleration and the slip rate of the road-wheel, and other factors. Such devices are disclosed, for example, in Japanese Patent Laid-open Prints No. Sho 60-154947 and No. Sho 62-31554 which were published without examination in 1985 and 1987, respectively.

Sometimes upon a jumping motion or a turning motion of the vehicle, the road-wheel may move away from the road surface, which will bring a temporary decrease of the load applied to the road-wheel. In general, as the load of the road-wheel is decreased, the road-wheel is apt to be in a more locked condition. If the foregoing reduction of the load of the road-wheel occurs while the braking pressure is being supplied thereto, the road-wheel is more or less compelled to be in a more locked condition. For the prevention of such situation, immediately upon the load reduction the braking force is set to be reduced. Upon recovery of the load of the road-wheel, the braking force is also increased up to a value which is the same as that when the load reduction occurred. However, the recovery of the braking force requires time, which prolongs of the braking distance. Similar problems will be raised in the traction control device.

SUMMARY OF THE INVENTION

It is therefore a primary object of the present invention to provide an anti-skid system for an automotive vehicle which prevents a prolongation of a braking distance even though the jumping or turning motion of the vehicle occurs.

In order to attain the foregoing objects, an anti-skid control system for use in an automotive vehicle is comprised of real slip rate detecting means for detecting a real slip rate of the vehicle, target slip rate setting means for setting a target slip rate of the vehicle, a braking force control means for adjusting a braking force in such a manner that a deviation between the real slip rate and the target slip rate becomes zero, load measuring means for measuring a load applied to the vehicle, correcting means for adding a value to the control means which is the product of coefficient and the deviation between the real slip rate and the target slip rate, and coefficient adjusting means for decreasing the coefficient as the load decreases.

BRIEF DESCRIPTION OF THE DRAWINGS

The above and other objects, features and advantages of the present invention will be more apparent and more readily appreciated from the following detailed description of preferred exemplary embodiment of the present invention, taken in connection with the accompanying drawings, in which.

DETAILED DESCRIPTION OF THE INVENTION

Embodiments of the present invention will be described hereinafter in detail with reference to the accompanying drawings.

Figure 2:
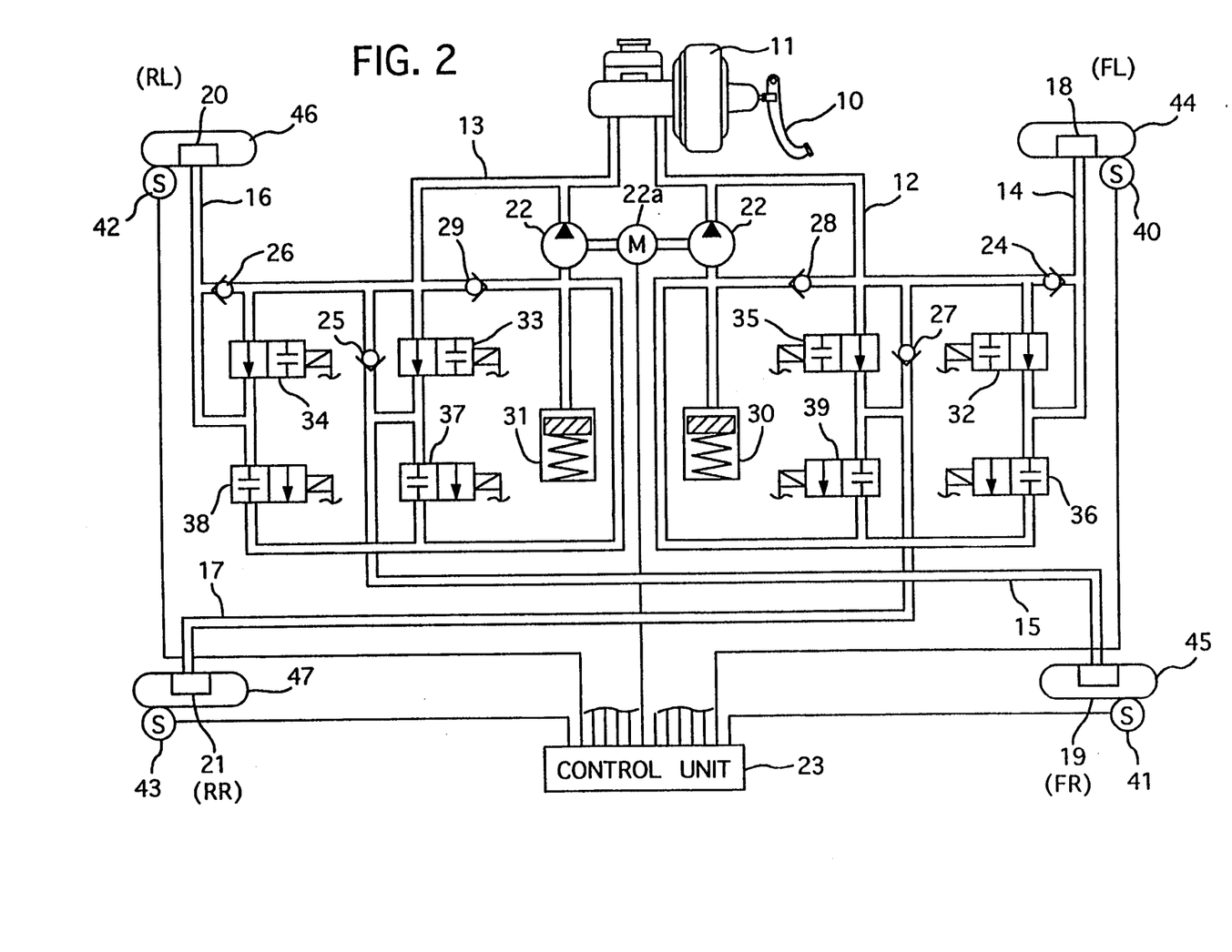
FIG. 2 shows an overall structure of an anti-skid system according to the present invention.

Referring first to FIG. 2, an overall structure of a pressure circuit of an anti-skid control system is shown. Conduits 12 and 13 are connected to a master cylinder 11. The conduit 12 is connected, via an electromagnetic valve 32 and a one-way valve 24, to a conduit 14 which is in fluid communication with a wheel cylinder 18 of a front-left road-wheel 44. The conduit 14 is also connected via an electromagnetic valve 36 to a drain 30. The conduit 12 is connected via an electromagnetic valve 35 and a one-way valve 27 to a conduit 17 which is in fluid communication with a wheel cylinder 21 of a rear-right road-wheel 47. The conduit 17 is connected to the drain 30 via an electromagnetic valve 39.

The conduit 13 is connected, via an electromagnetic valve 33 and a one-way valve 25, to a conduit 15 which is in fluid communication with a wheel cylinder 19 of a front-right road-wheel 45. The conduit 15 is also connected via an electromagnetic valve 34 and a one-way valve 26 to a conduit 16 which is in fluid communication with a wheel cylinder 20 of a rear-left road-wheel 46. The conduit 16 is connected to the drain 31 via an electromagnetic valve 38.

Each one-way valve is set to be opened, when an inner pressure of the corresponding wheel cylinder is above the pressure in the conduit 112 (13), for returning the braking pressure thereto, which leads to a prevention of an excessive supply of the braking pressure to each road-wheel. Each of the electromagnetic valves 32, 33, 34 and 35 is a normally open type valve, and is set to be closed when energized or actuated. Each of the electromagnetic valves 36, 37, 38 and 39 is a normally closed type valve, and is set to be opened when energized or actuated. Thus, so long as no electromagnetic valves are being energized or actuated, the fluid communication of the conduit 12 with the conduits 14 and 17 is established as well as the fluid communication of the conduit 13 with the conduits 15 and 16. Upon depression of a brae pedal 10, the master cylinder 11 increases the fluid pressure in each of the conduits 12 and 13. The resultant pressure increase is transmitted to the wheel cylinders 18, 19, 20 and 21 for regulating the rotations of the road-wheels 44, 45 46 and 47, respectively. This means that the braking force depends on the degree of the depression of the brake pedal 10.

A pair of pumps 22, 22 are set to be driven by a motor 22a. Outlet ports of the pumps 22,22 are connected to the conduits 12 and 13, respectively. As previously described, during the de-energized condition of each of the electromagnetic valves, the conduit 12 (13) is in fluid communication with the wheel cylinders 18 and 21 (19 and 20). Under such condition, if the motor 22a is driven or turned on, regardless of the depression of the brake pedal 10, the inner pressure of each of the wheel cylinders 18, 19, 20 and 21 can be increased. Then, both of the electromagnetic valves 32 and 36 are energized, the electromagnetic valves 32 and 36 are closed and opened, respectively, and the fluid in the wheel cylinder 18 is drained into the drain 30. Thus activation of the electromagnetic valves 32 and 36 will decrease the inner pressure of the wheel cylinder 18 of front-left road-wheel. Similarly, the inner pressure of the wheel cylinder 21 of the rear-right road-wheel 47, the wheel cylinder 21 of the front-right road-wheel 45 and the wheel cylinder 20 of the rear-left road-wheel 46 can be decreased by the actuation of the electromagnetic valves 33 and 37, and the actuation of the electromagnetic valves 34 and 38, respectively. The foregoing operation of each of the combination of two electromagnetic valves enables the inner pressure of the wheel cylinder to be controlled, which results in the adjustment of the control of the respective road-wheel. The motor 22a and the electromagnetic valves are under the control of an electric control unit 23 which is in the form of a microprocessor or CPU. It is to be noted that a one-way valve 28(29) is disposed between the conduit 12 (13) and the drain 30 (31) in order that when the pressure in the drain 30 (31) exceeds a set value, the pressure is returned to the conduit 12 (13).

Figure 3:
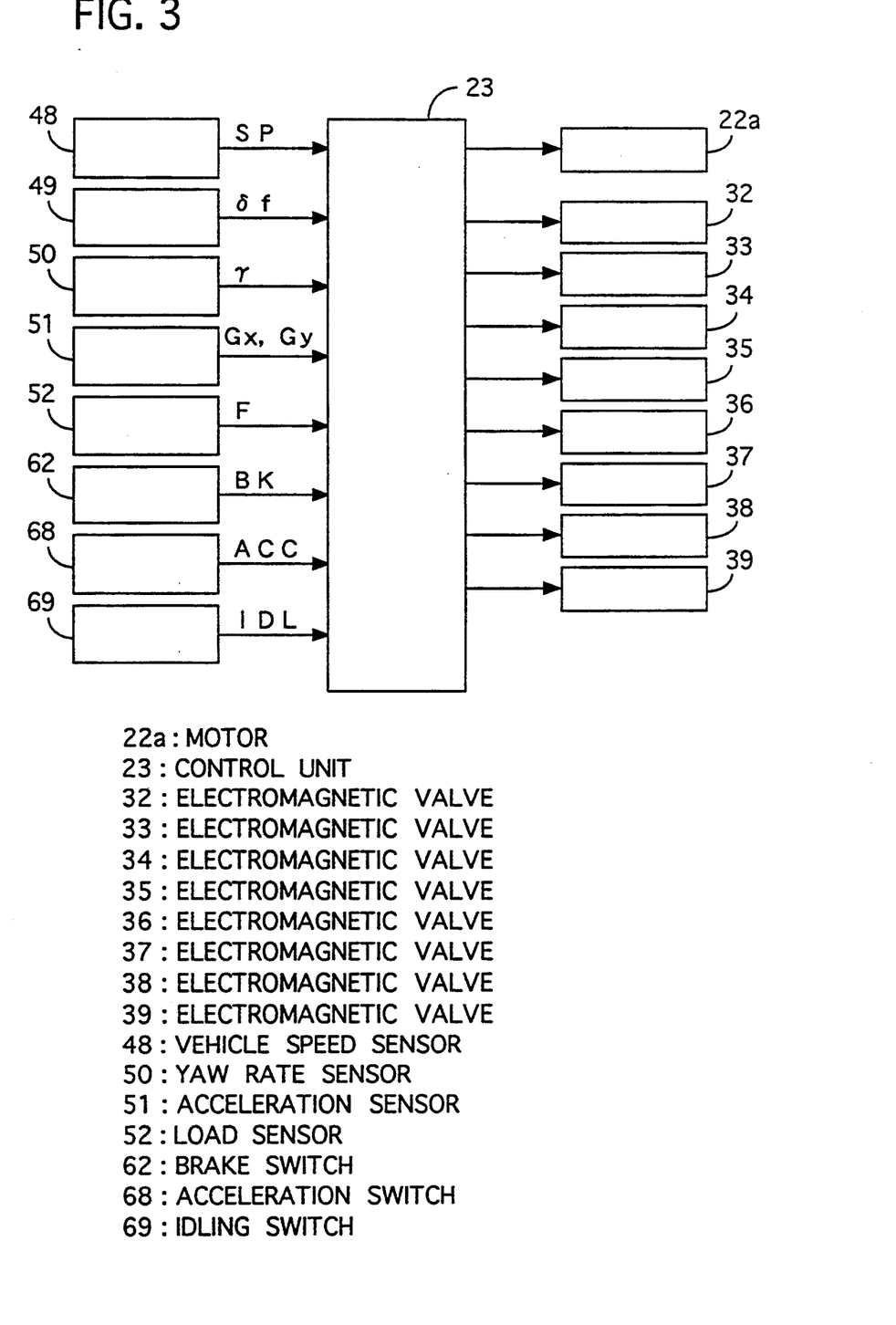
FIG. 3 is a block diagram showing the relationship between an electric control unit and each of the sensors.

Sensor means 40, 41, 42 and 43 are provided to the front-left road wheel 44, the front-right road wheel 41, the rear-left road-wheel 46, and the rear-right road-wheel 47, respectively, in order to feed signals relating to the conditions thereof to the electric control unit 23. Each sensor means 40, 41, 42, 43 includes a vehicle speed sensor 48 and a lead sensor 52 (FIG. 3). As shown in FIG. 3, the vehicle speed sensor 48 is set to detect the rotational speed of each road wheel and the resulting speed is fed as pulse signals SP to the control unit 23. The load sensor 52 is set to detect a load F applied to each road-wheel. This load sensor 52 can be used as an estimated load sensor which estimate the load on the basis of a sprung acceleration, an unsprung acceleration, a vehicle-height and a pressure from the suspension. In addition to the foregoing sensors, the control unit 23 is connected with a steering angle sensor 49 detecting a steering angle $\delta$ f, a yaw rate sensor 50 detecting a yaw rate $\gamma$, and an acceleration sensor 51 detection accelerations GX and GY in the longitudinal and lateral directions, respectively, of the vehicle-body. The control unit 23 is also connected with a brake switch 62 which detects the depression of the brake pedal 10. On the basis of signals from the sensors 48 through 52, the control unit 23 is set to operate the motor 22a and the electromagnetic valves 42 through 39.

Figure 1:
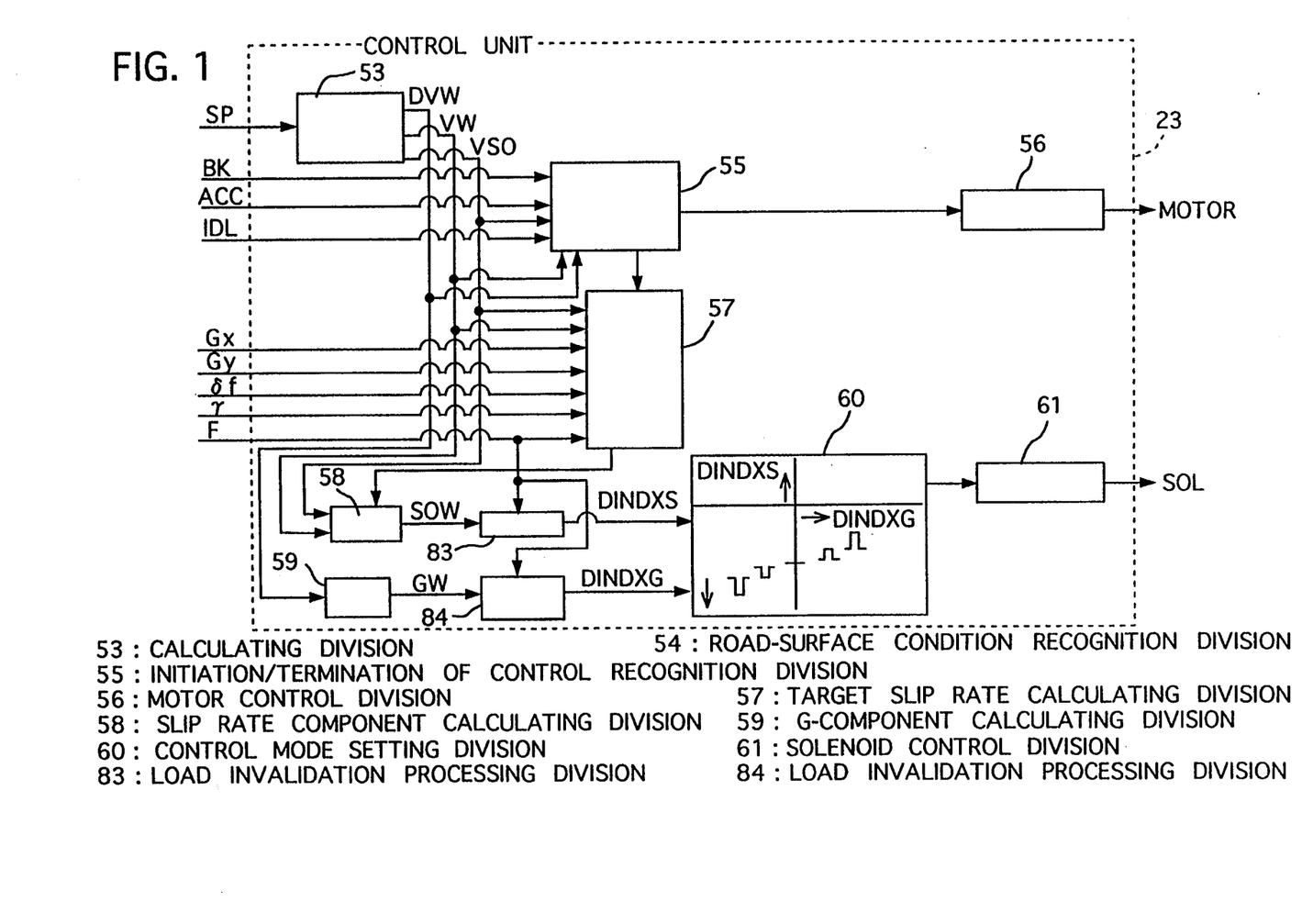
FIG. 1 is a block diagram showing a slip rate calculating division of an anti-skid system according to the present invention.

The control unit 23, as shown in FIG. 1, includes a calculating division 53 for calculating the vehicle speed, the acceleration, and the estimated speed, a road-surface condition recognition division 54, an initiation/termination of the control recognition division 55, a motor control division 56, a target slip rate calculating division 57, a slip rate component calculating division 58, a G-component calculating division 59, a control mode setting division 60, and a solenoid control division 61. In the road-surface condition recognition division 54, the condition of a road surface is recognized on the basis of the wheel speed and other factors. The initiation/termination of the control recognition division 55 is set to make a decision whether an ABS control should be established or not. The motor control division 56 drives the motor 22a for generating the fluid pressure depending on the ABS control condition. IN the target slip rate calculating division 57, a target slip rate of each rear-wheel is set to be calculated. IN the slip rate component calculating division 58, and the G-component calculating division 59, a slip rate and an acceleration component for setting the control mode are calculated, respectively. In the control mode setting division 60, on the basis of the slip rate and the acceleration component, the control mode for each road-wheel is obtained. In the solenoid control division 61, on the basis of the resultant control mode in the control mode setting division 60, the electromagnetic valves are controlled corresponding to each road-wheel in order to adjust the fluid pressure of the wheel cylinder, thereby adjusting the slip condition of each road-wheel. It is to be noted that the road-wheels 44, 45, 46 and 47 are set to be controlled independently by the foregoing divisions other than the initiation/termination of the control recognition division 55 and the motor control division 56.

Hereinafter each division of the control unit will be detailed. In the calculating division 53, a rotational acceleration DVW, a rotational speed VW, and an estimated vehicle speed VSO of each road-wheel are calculated on the basis of the signal SP from the respective wheel speed sensor 48. The estimated speed is defined as the vehicle speed at a portion thereof at which each road-wheel is provided. The rotational speed of VW is set to be calculated based on the radius of each road-wheel and the width of pulse (or a periodic time) of the signal SP. The rotational acceleration DVW is obtained by differentiating the rotational speed of VW with respect to time t. The estimated vehicle speed VSO of each road-wheel is obtained from the respective rotational speed of VW in light of the turning motion of the vehicle and other factors.

The initiation/termination of the control recognition division 55 establishes an initiation and a termination of the anti-skid control based on a brake output BK of the brake switch 62, the estimated vehicle speed VSO, the rotational acceleration DVW and the rotational speed VW. If the brake switch 62 is in on-condition and the estimated vehicle speed VSO is within a predetermined range, the anti-skid control is deemed to be initiated. If the termination of the pulse-increase mode is found in each road-wheel, then the anti-skid control is deemed to be terminated.

In the motor control division 56, upon receipt of signals for the initiation and termination from the initiation/termination of the control recognition division 55, the motor 22a is turned on and turned off, respectively.

Figure 4:
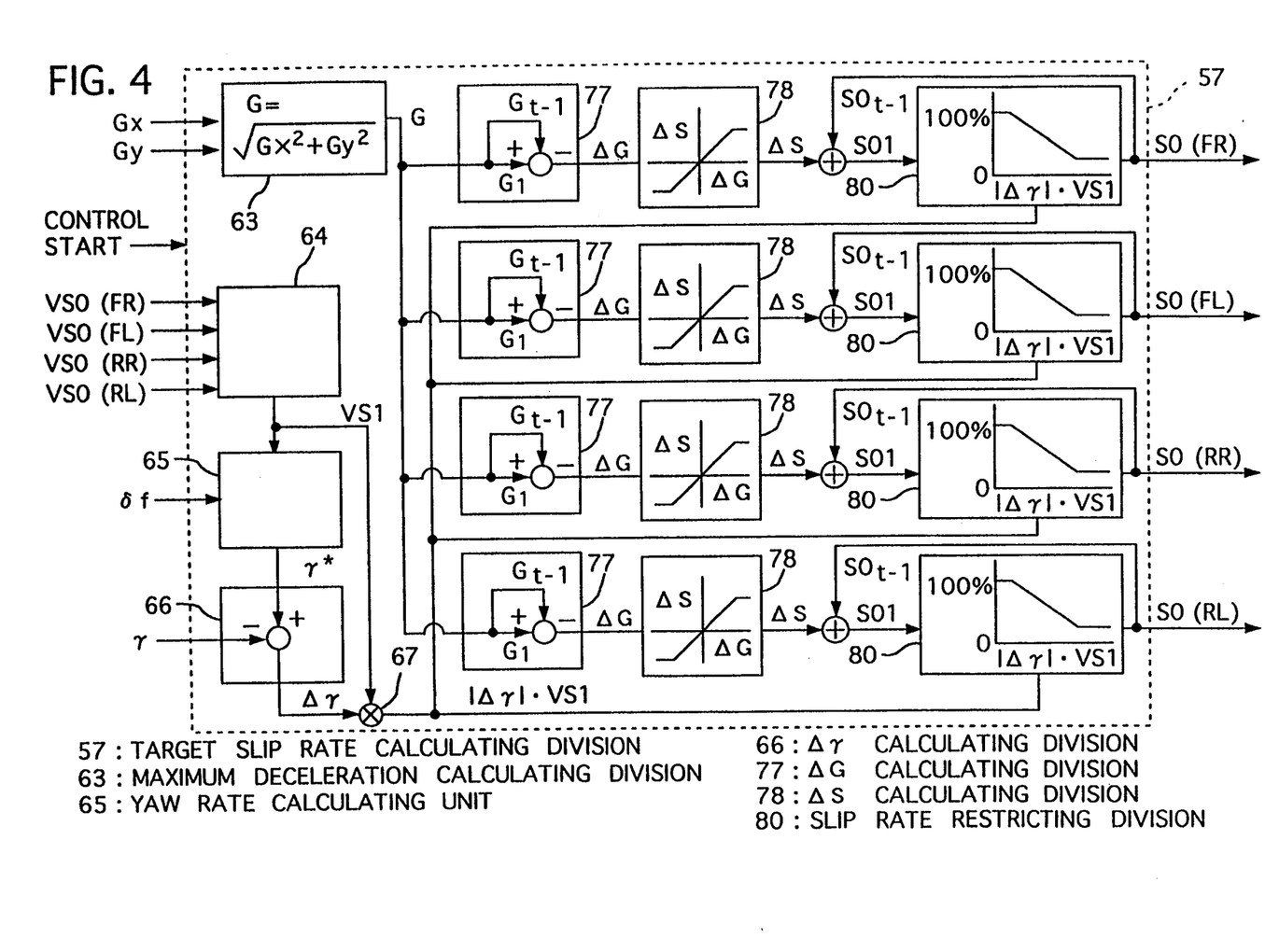
FIG. 4 is a block diagram showing a detailed structure of a target slip rate calculating division of an electric control unit.

The target slip rate calculating division 57 is set to calculate the target slip rate on the basis of the longitudinal acceleration GX, the lateral acceleration GY, the steering angle δ f, the real yaw rate γ, the load F, the estimated vehicle speed VSO, and the road surface condition. The detailed structure of the calculating division 57 is illustrated in FIG. 4. The target slip rate SO is calculated at each of the calculating units corresponding to the road-wheels, on the basis of the maximum deceleration G, the maximum vehicle speed VS1, the yaw rate deviation Δγ, the road surface, the condition upon initiation of the ABS control, each estimated vehicle speed VSO, each rotational speed VW, and the load F.

The maximum deceleration G is obtained at a maximum deceleration calculating unit 63 by using the following formula (1).

$$G + (GX^2 + GY^2)^{\frac{1}{2}} \tag{1}$$

The maximum vehicle speed V1 is obtained, at a maximum vehicle speed calculating unit 64, as the maximum value of the estimated vehicle speed VSO of each road-wheel. As for the yaw rate deviation Δγ, first of all, a target yaw rate γ* is obtained at a target yaw rate calculating unit 65 by using the following formula (2).

$$\gamma^* = (G_8 \times \delta f)/(130\, \gamma S) \times VS1/(1 + Kh \times VS1^2) \tag{2}$$

The yaw rate deviation Δγ is calculated at a Δγ—calculating unit 66 by using the following formula (3).

$$\Delta\gamma + \gamma^* - \gamma \tag{3}$$

Figure 6:
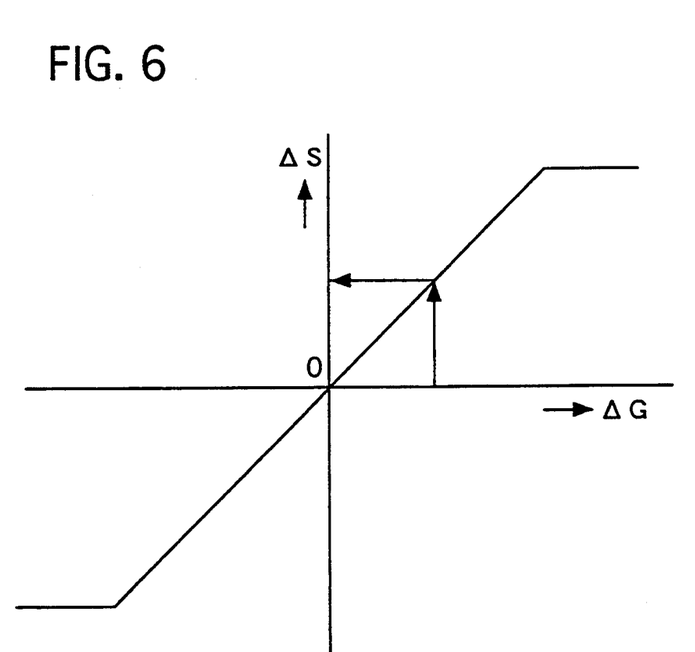
FIG. 6 is a graph showing an operation of a $\Delta S$ calculating portion of an electric control unit.

The acceleration G obtained at the maximum deceleration calculating division 63 is fed to a Δ G calculating division 77 to be subtracted by the latest value Gt−1 of the acceleration for obtaining an acceleration increment Δ G. At the Δ S-calculating portion 78, the acceleration increment Δ G is corresponded to a graph shown in FIG. 6 and a slip ratio increment Δ S is obtained. The present target slip ratio S01 is calculated by addition of the resultant slip rate increment Δ S and the latest slip rate S01t−1.

Figure 5:
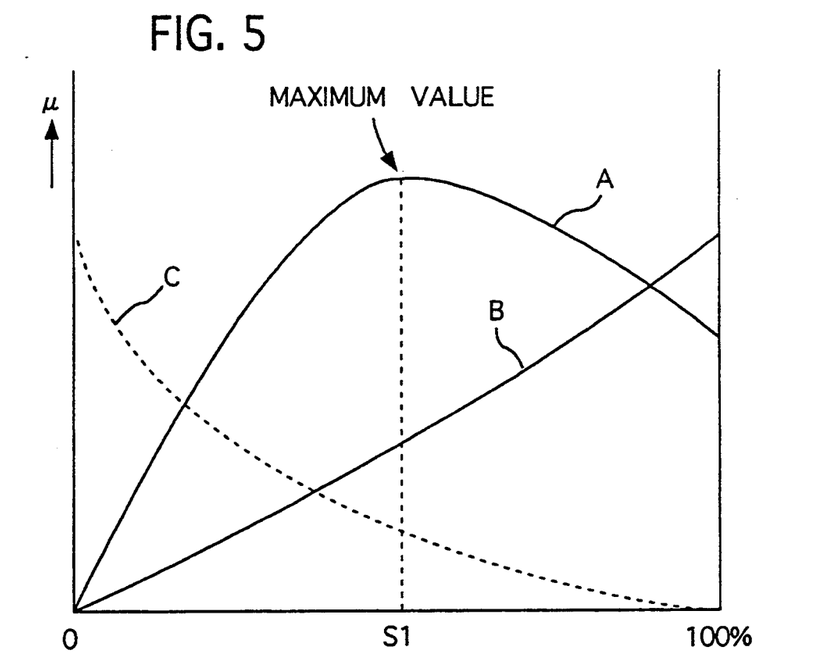
FIG. 5 is a graph showing the relationship between a $\mu$ and a slip rate.

In the foregoing processing, if the deceleration increases with the passing of time, Δ G and a Δ become positive, resulting in the increase of the target slip rate. Thus the slip quantity of each road-wheel is increased which leads to the increase of the vehicle's deceleration being restricted. On the other hand, if the deceleration decreases with the passing of time, Δ G and Δ S become negative, resulting in the decrease of the target slip rate. Thus the slip quantity of each road-wheel is decreased which leads to the vehicle's deceleration being increased. Thus the continuation of the foregoing processing will bring the maximum value of deceleration. In relation to the slip rate, the deceleration is proved to be of only one maximum value, which results in that this maximum value is the greatest value of the deceleration as apparent from real-line graphs A and B in FIG. 5. That is to say, in the foregoing processing, except for the slip rate regulating portion 80, remaining elements serve for obtaining the target slip rate which brings the greatest deceleration. As the graph shows, at a slip rate of about 10–20%, the μ attains its maximum value on a normal road. The μ is in proportion to the deceleration. Thus on the normal road, the braking operation under which the slip rate ranges from 10 to 20%, will bring the minimum braking distance. However, on a gravel road the locked condition of each road-wheel brings the minimum braking distance. In such case, as the graph B shows, the μ reaches its maximum value upon a slip rate of 100%. Under such control, on even such a road condition, the braking operation or the anti-skid condition is established for obtaining the maximum deceleration. Thus, according to the anti-skid condition of the present device, the minimum braking distance can be attained regardless of the road surface condition.

In the foregoing control, the acceleration detected by the acceleration sensor is set to be maximized. However instead of such acceleration, the differential value of the vehicle speed VSO detected at each road-wheel is available. In addition, in light of the fact that the μ between the road surface and the road-wheel can be obtained on the basis of the acceleration G and the load F, the same results will be obtained by the control wherein the μ is maximized after its obtaining from the acceleration G and the load F for each road-wheel. The reason is that the load should be considered in order to establish more precious control.

Figure 7:
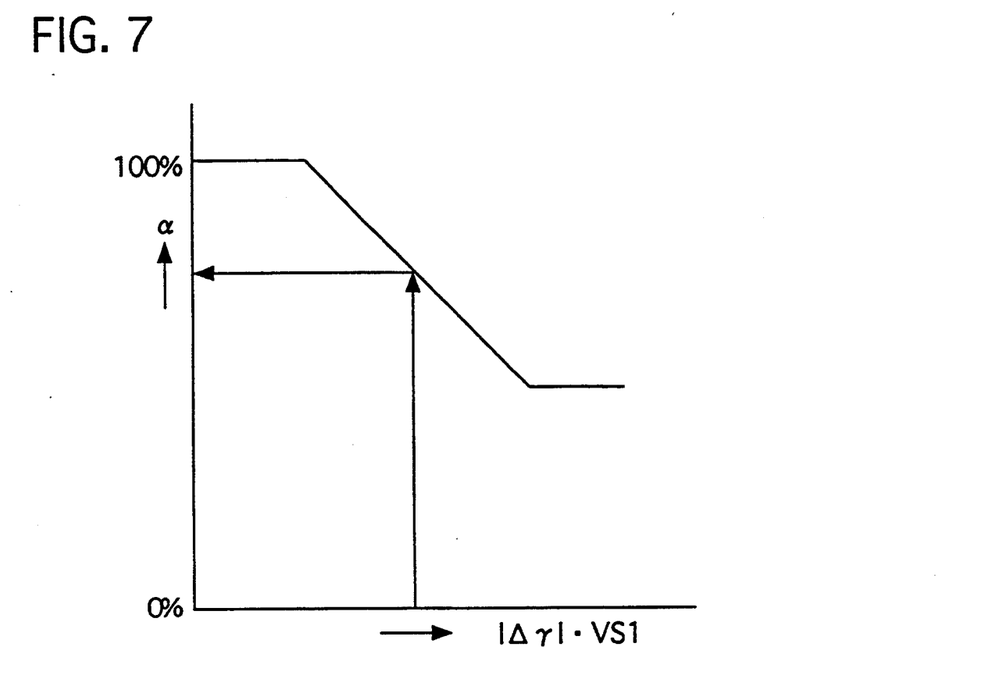
FIG. 7 is a graph showing an operation of a slip rate regulating portion of an electric control unit.
Figure 8:
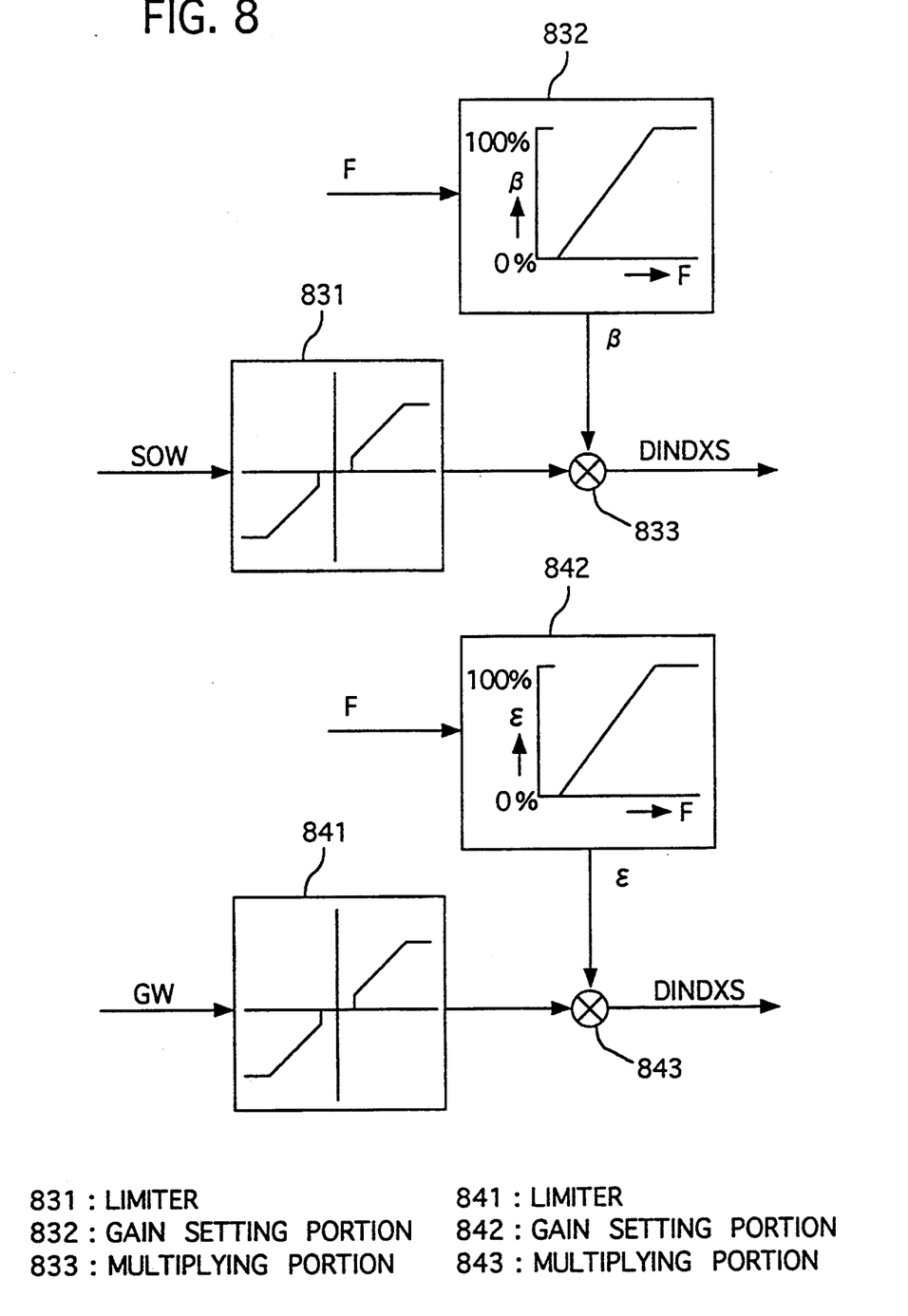
FIG. 8 is a block diagram of a restricting division.

Thus resultant target slip rate S01 is regulated or restricted at the slip rate restriction division 80 to which is provided the product of the maximum vehicle speed VS1 obtained at the calculating division 67 and the absolute value of the yaw rate deviation Δγ. On the basis of this product value with reference to a graph shown in FIG. 7, a rate α is obtained and the resultant rate e is multiplied with the target slip rate S01 for obtaining the target slip rate S0. As the maximum vehicle speed VS1 increase or as the yaw rate deviation Δγ, the target slip rate SO decreases. Thus so long as the steering operation and the actual turning motion of the vehicle are in coincidence, the control for chasing the maximum slip rate as will be detailed and if both become out of coincidence the target slip rate is set to be decreased for effecting the cornering force.

Referring back to FIG. 1, the obtained target slip rate is set to be fed to the component calculating division 58 and on the basis of the following formula (4) the slip rate component DINDXS is calculated.

$$DINDXS = S0 - (VS0 - VW - IVW - BVW)/VS0 \tag{4}$$

wherein IVW is an integrated value of the rotational speed of the wheel VW, and BVW is a constant.

Figure 9:
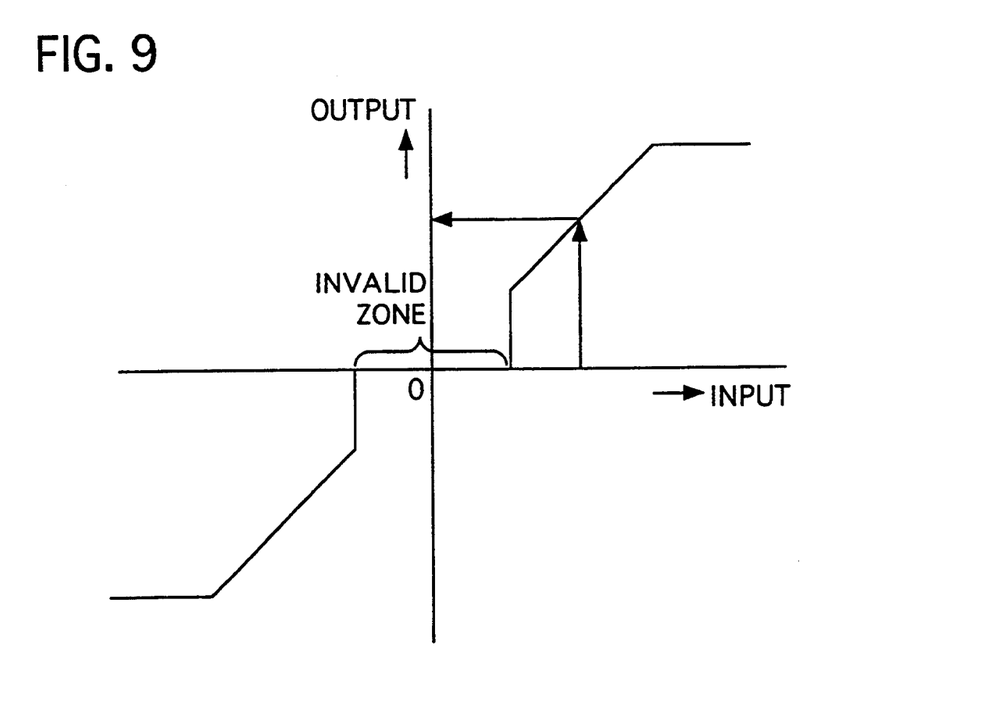
FIG. 9 is a graph showing an operation of a limiter of an electric control unit.

In this formula, (VS0−VW)/VS0 corresponds to the real slip rate S1. The slip rate component DINDXS is then fed via a load invalidation processing division 83 to the control mode setting division 60. The load invalidation processing division 83 includes a limiter 831 and a coefficient setting portion 832. The limiter 831 establishes an invalid zone which serves for invalidating the function of the braking operation when the slip rate component SOW is less than a value as shown in FIG. 9. The reason is to prevent the control in response to a noise included in the slip rate component SOW. The foregoing integrated value IVW serves for the correction of the slip rate when the slip rate component SOW is generated within a minute range for a long time. The constant BVW serves for increasing a deviation between the target slip rate and the real slip rate when the rotational speed VW is low. As the vehicle speed becomes higher VS0 becomes extremely large relative to BVW, BVW becomes neglectably small. Thus the slip rate component S0W is a substantial modification of a value which is obtained by subtracting the real slip rate from the target slip rate SO and shows a slip rate deviation.

Figure 10:
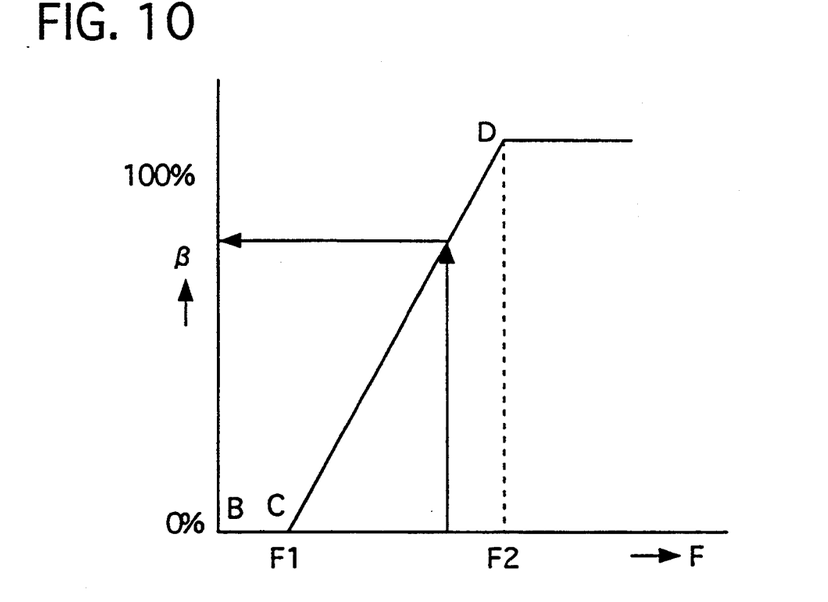
FIG. 10 is a graph showing a coefficient setting division of an electric control unit.

The coefficient setting portion 832 serves for obtaining a coefficient $\beta$ from the load F with reference to a graph shown in FIG. 10. At a multiplying portion 833, the modification of a value is obtained which is the product of the coefficient $\beta$ and the slip rate component SOW passing through the limiter 831. The foregoing coefficient $\beta$ becomes 100% when the load F is equal to or greater than a value of F2, and is decreased gradually below F2 which results in that $\beta$ becomes 0% at a value of F1. Thus, so long as the load F is in excess of F2, the coefficient $\beta$ is 100%, and the slip rate component SOW passing through the limiter 831 is as it is regarded as the slip rate component DINDXS. However as the load F decreases the coefficient $\beta$ also decreases, resulting in that the slip rate component DINDXS becomes less.

In the G-component calculating division 59, a G-component GW is obtained by subtracting a set value GO from the wheel acceleration DVW. The resultant G-component GW is passed through a load invalidating processing division 84 and is fed as the G-component DINDXG to the control mode setting division 60. The load invalidating processing division 84, similar to the foregoing load invalidating processing division 83, has a coefficient setting portion 842 and a multiplying portion 843. The limiter 841, as shown in FIG. 9 invalidates the control when the G-component GW is less than a set value. The reason is to prevent the control in response to a noise included in the G-component GW. At the coefficient setting portion 842, with reference to a graph shown in FIG. 11, a coefficient $\epsilon$ is obtained on the basis of the load F. At a multiplying portion 843, the modification of a value is obtained which is the product of the coefficient $\epsilon$ and the slip rate component GW passing through the limiter 841. The foregoing coefficient $\epsilon$ becomes 100% when the load F is equal to or greater than a value of F4 and is decreased gradually below F4 which results in that $\epsilon$ becomes 0% at a value of F3. Thus, so long as the load F is in excess of F3, the coefficient $\epsilon$ is 100% and the slip rate component GW passing through the limiter 841 is, as it is, regarded as the slip rate component DINDXG. However, as the load F decreases, the coefficient $\epsilon$ also decreases, resulting in that the slip rate component DINDXG becomes less.

Figure 12:
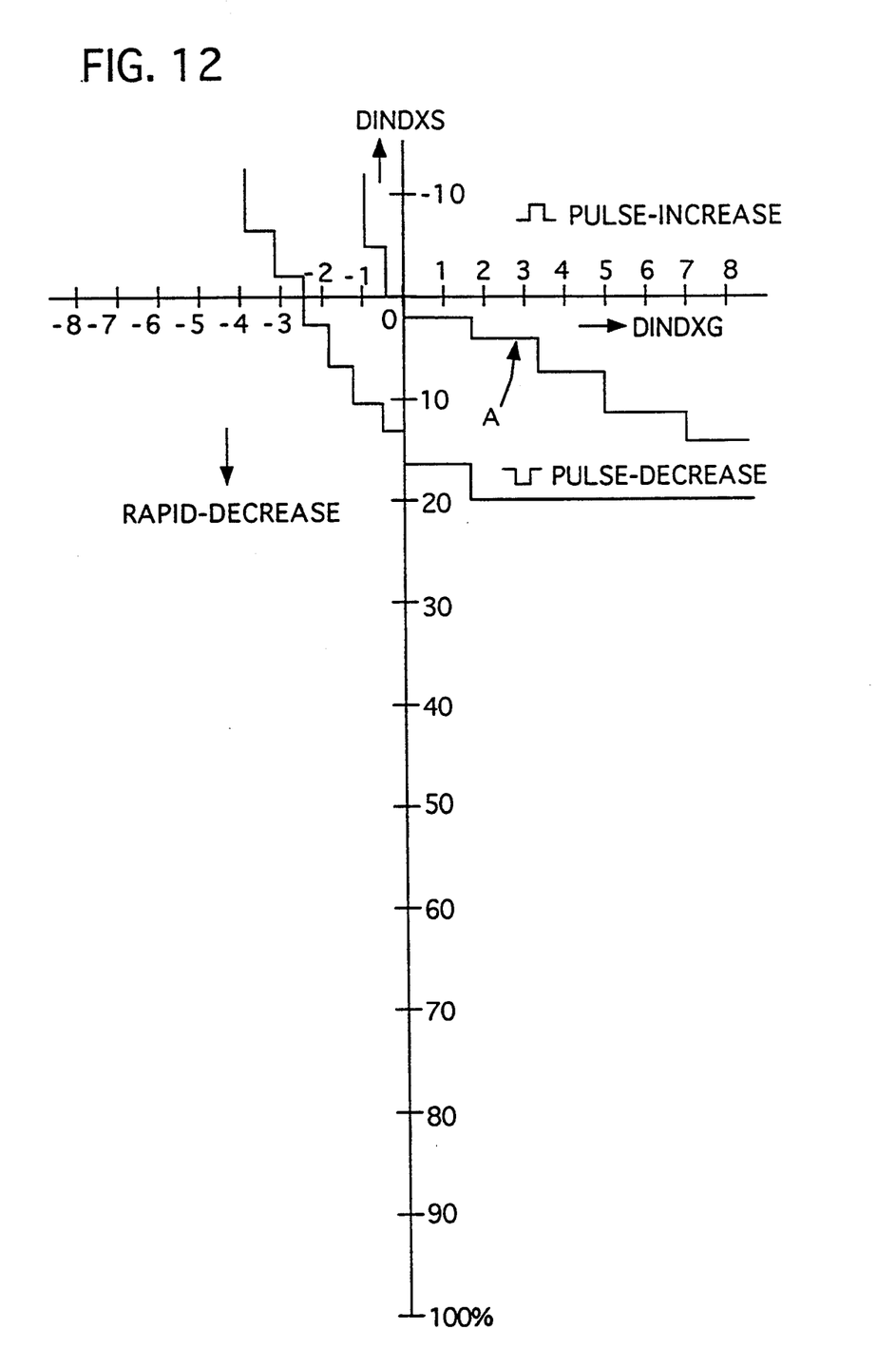
FIG. 12 is a graph showing a control mode setting division of an electric control unit.

The control mode setting division 60 begins to set a control mode upon receipt of the slip rate component DINDXS and the G-component. Three modes, the pulse-increase mode, the pulse-decrease mode and the rapid-decrease mode are available. As described previously, the pressure in each of the wheel cylinders is increase thereby to increase the braking force when the electromagnetic valves 32-35 are opened and the pressure in each of the wheel cylinders is decreased thereby to decrease the braking force when the electromagnetic valves 36-39 are opened. In the pulse-increase mode, under the closure of each of the electromagnetic valves 36-39, each of the electromagnetic valves 32-35 is set to be under the duty-control for increasing the braking pressure wherein an opening time of each of valves 32-35 is adjusted. In the pulse-decrease mode, under the closure of each of the electromagnetic valves 32-35, each of the electromagnetic valves 36-39 is set to be under the duty-control for decreasing the braking pressure wherein an opening time of each of valves 36-39 is adjusted. In the rapid-decreasing mode, the pressure in each of the wheel cylinder is rapidly decreased by establishing a condition wherein valves 32-35 are closed and the valves 36-39 are opened. At the mode setting division 60, concurrently with setting the foregoing three modes, the valve opening time and the pulse width are set in case of the pulse-increasing mode or the pulse decreasing mode. The setting of each mode is established based on a chart shown in FIG. 12. In this chart, in principle, as the slip rate increases the pulse-increasing mode, the pulse-decreasing mode and rapid-decreasing mode are set to be established in such order and as the acceleration decreases the pulse-increasing mode, the pulse-decreasing mode and the rapid-decreasing mode ar set to be established in such order. When the G-component is 0, the pulses increase slightly in case the deviation between the target slip rate and the real slip rate is 0 and as the slip rate deviation increases, the pulse-decreasing mode and the rapid-decreasing mode are established in turn. In the chart, under this situation, corrections are set to be made toward the pulse-increasing mode and the pulse-decreasing mode when the deceleration is increased and decreased, respectively. Thus the braking force is so adjusted to establish a coincidence of the target slip rate with the real slip rate resulting in that ultimate coincidence is attained. Since this adjustment is made previously according to the acceleration, the quick control can be established.

In this chart, a graph A shows a hold condition or another condition similar thereto under which the pulse is neither increased or decreased. Within a range of the pulse-increasing mode, a time required for increasing pressure increases when moving up to the right. In addition, within a range of the pulse-decreasing mode, a time required for decreasing pressure increases when moving down to the right. Thus in the neighborhood of the graph A, the time for increasing or decreasing pressure is less, the pressure in the wheel cylinder remains substantially unchanged. Since the graph A passes the original point of the chart, when either the slip rate component DINDXS or the G-component DINDXG becomes zero, the control enters the hold condition. Thus as previously mentioned, when the coefficient $\beta$ and $\epsilon$ are decreased in response to the decrease of the load F, the control approaches the hold condition which results in less pressure change in the wheel cylinder. When the load F becomes about zero, each coefficient also becomes zero resulting in the hold condition completely. Thus the pressure in the wheel cylinder remains unchanged. It is to be noted that in FIG. 12, a region within which the hold condition is established may be set between the pulse-increasing mode and the pulse-decreasing mode areas.

The solenoid control division 61 serves for controlling the electromagnetic valves 32 through 39 based on the set mode at the control mode setting division 60, the valve opening time, the valve closing time, and the periodic time. In the pulse-increasing mode, the electromagnetic valves 36-39 are entirely closed and the electromagnetic valves 32-35 are opened for a set time. The electromagnetic valves 32-35 are closed for a remaining time in a period. This opening and closing operation of each of the electromagnetic valves 32-35 is repeated. In the pulse-decreasing mode, the electromagnetic valves 32-35 are entirely closed and the electromagnetic valves 36-39 are opened for a set time. The electromagnetic valves 36-39 are closed for a remaining time in a period. This opening and closing operation of each of the electromagnetic valves 36-39 is repeated.

As mentioned above, in the present invention, since the pressure in each wheel cylinder is adjusted by the increase or the decrease thereof in case of the target slip rate, the slip condition of each road-wheel is in coincidence with the target value set in the control unit. When the load F decreased rapidly during the braking operation, the control is transferred to the hold mode or near the hold mode. Thereafter, the load recovers as it was and the control is returned to what it was. If no change is established relating to the control, the real slip rate is increased relative to the target slip rate, resulting in the increase of the slip rate component DINDIX in the minimum direction. This movement corresponds to the downward one in FIG. 12 which leads to the control into the rapid-decreasing mode. Thus the pressure in the wheel cylinder decreases. Under the resultant situation if the load F recovers, the pressure in the wheel cylinder is set to be increased in order to adjust the real slip rate relative to the target slip rate. It takes a long time for the pressure recovery which will delay the initiation of the control. This leads to the prolongation of the braking distance if such delay occurs during the braking operation. In addition, if such delay occurs in the course of the acceleration, its performance is not so good. However, according to the present invention, the control is brought into an insufficient one or a malfunction depending on the load, which ensures the prevention of the initiation of the control even if the load decreases during a jumping motion or a turning motion of the vehicle.

Figure 11:
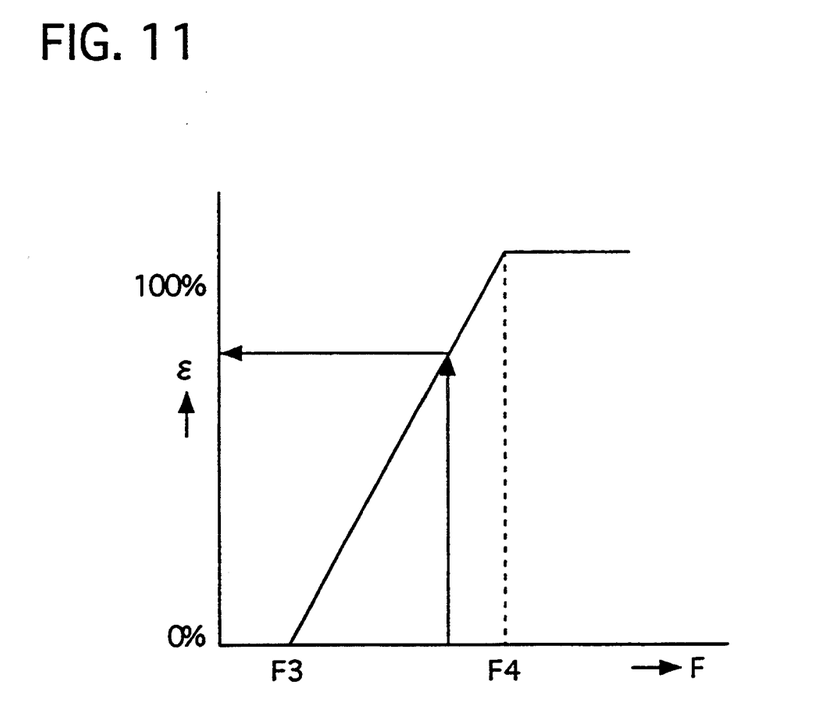
FIG. 11 is a graph showing a coefficient setting division of an electric control unit.

As detailed above, the load invalidating processing divisions 83 and 84 serve for adjusting the sensitivity of the braking operation depending on the graphs shown in FIGS. 10 and 11, respectively. Along a straight line between a point B and a point C, the coefficient $\beta$ remains zero which brings the malfunction or the invalidity of the newly established braking operation and thus the current braking force remains unchanged. Between the point C and a point D, the newly established braking operation becomes less or insufficient as the load decreases. Thus in the present embodiment as the load decreases the coefficient is lowered and the newly established braking operation becomes less or insufficient. In addition, when the load is less than a set value, the braking force remains unchanged by invalidating the newly established braking operation. However, other methods can bring the same result. For example, by moving the point C in order that the coefficient $\beta$ becomes zero or a value when the load is zero in FIG. 10, a practical result can be attained without realizing the complete invalidation of the newly established braking operation. In addition, by letting F1=F2, a rapid invalidation of the newly established braking operation may be available. In this method, a gradual realization of insufficient new establishment of the braking operation is omitted. Though in this embodiment the coefficient setting division is provided independently, an inclination of the graph shown in FIG. 9 can be changed depending on the load which is achieved by changing input-output characteristics regarding the load at each limiter 831/841.

In this embodiment, in order to reduce the braking distance during the braking operation, the target slip rate is set to be calculated in order that each of the $\mu$ and the deceleration can be maximized. However, the target slip rate can be fixed at a set value previously.

The invention has thus been shown and described with reference to a specific embodiment, however, it should be noted that the invention is in no way limited to the details of the illustrated structures but changes and modifications may be made without departing from the scope of the invention.

What is claimed is:

1. An anti-skid control system for use in an automotive vehicle comprising:
   real slip rate detecting means for detecting a real slip rate of the vehicle;
   target slip rate setting means for setting a target slip rate of the vehicle;
   load measuring means for measuring a load applied to the vehicle;
   correction means for obtaining a corrected deviation by multiplying a coefficient with a deviation between the target slip rate and the real slip rate;
   coefficient changing means for decreasing the coefficient as the load decreases; and
   braking force control means for controlling a braking force in such a manner that the real slip rate approaches the target slip rate, the control sensitivity of the braking force control means being dependent on the corrected deviation.

2. An anti-skid control system in accordance with claim 1, wherein the coefficient is set to be zero when the load is zero.

3. An anti-skid control system in accordance with claim 1, wherein the coefficient is set to be 1 when the load is in excess of a predetermined value.

4. An anti-skid control system for use in an automotive vehicle having plural wheels comprising:
   real slip rate detecting means for detecting a real slip rate of each of the wheels;
   target slip rate setting means for setting a target slip rate of each of the wheels;
   load measuring means for measuring a load applied to each of the wheels;
   correction means for obtaining a corrected deviation by multiplying a coefficient with a deviation between the target slip rate and the real slip rate;
   coefficient changing means for decreasing the coefficient as the load decreases; and
   braking force control means for controlling a braking force of each of the wheels in such a manner that the real slip rate approaches the target slip rate, the control sensitivity of the braking force control means being dependent on the corrected deviation.

5. An anti-skid control system in accordance with claim 4, wherein the coefficient is set to be zero when the load is zero.

6. An anti-skid control system in accordance with claim 4, wherein the coefficient is set to be 1 when the load is in excess of a predetermined value.

7. An anti-skid control system for use in an automotive vehicle comprising:
   real slip rate detecting means for detecting a real slip rate of the vehicle;
   target slip rate setting means for setting a target slip rate of the vehicle;
   load measuring means for measuring a load applied to the vehicle;
   correction means for obtaining a corrected deviation by multiplying a coefficient with a deviation between the target slip rate and the real slip rate;
   coefficient changing means for decreasing the coefficient as the load decreases; and
   braking force control means for controlling a braking force in such a manner that the real slip rate approaches the target slip rate, the control sensitivity of the braking force control means being set to be in malfunction based on the corrected deviation.

8. An anti-skid control system for use in an automotive vehicle having plural wheels comprising:
real slip rate detecting means for detecting a real slip rate of each of the wheels;
target slip rate setting means for setting a target slip rate of each of the wheels;
load measuring means for measuring a load applied to each of the wheels;
correction means for obtaining a corrected deviation by multiplying a coefficient with a deviation between the target slip rate and the real slip rate;
coefficient changing means for decreasing the coefficient as the load decreases; and
braking force control means for controlling a braking force of each of the wheels in such a manner that the real slip rate approaches the target slip rate, the control sensitivity of the braking force control means being set to be in malfunction based on the corrected deviation.

9. An anti-skid control system for use in an automotive vehicle having plural wheels comprising:
real slip rate detecting means for detecting a real slip rate of each of the wheels;
target slip rate setting means for setting a target slip rate of each of the wheels;
load measuring means for measuring a load applied to each of the wheels;
correction means for obtaining a corrected deviation by multiplying a coefficient with a deviation between the target slip rate and the real slip rate;
coefficient changing means for decreasing the coefficient as the load decreases; and
braking force control means for controlling a braking force in such a manner that the real slip rate approaches the target slip rate, the control sensitivity of the braking force control means being set to be slowed down based on the corrected deviation.

10. An anti-skid control system for use in an automotive vehicle having plural wheels comprising:
real slip rate detecting means for detecting a real slip rate of each of the wheels;
target slip rate setting means for setting a target slip rate of each of the wheels;
load measuring means for measuring a load applied to each of the wheels;
correction means for obtaining a corrected deviation by multiplying a coefficient with a deviation between the target slip rate and the real slip rate;
coefficient changing means for decreasing the coefficient as the load decreases; and
braking force control means for controlling a braking force of each of the wheels in such a manner that the real slip rate approaches the target slip rate, the control sensitivity of the braking force control means being set to be slowed down based on the corrected deviation.

11. An anti-skid control system for use in an automotive vehicle comprising:
real slip rate detecting means for detecting a real slip rate of the vehicle;
target slip rate setting means for setting a target slip rate of the vehicle;
real acceleration detecting means for detecting a real acceleration of the vehicle;
load measuring means for measuring a load applied to the vehicle;
first correction means for obtaining a first corrected deviation by multiplying a first coefficient with a first deviation between the target slip rate and the real slip rate;
second correction means for obtaining a second corrected deviation by multiplying a second coefficient with a second deviation between the real acceleration and a estimated acceleration;
coefficient changing means for decreasing each of the first coefficient and the second coefficient as the load decreases; and
braking force control means for controlling a braking force in such a manner that the real slip rate approaches the target slip rate, the control sensitivity of the braking force control means being dependent on the first corrected deviation and the second corrected deviation.

12. An anti-skid control system in accordance with claim 11, wherein each of the first coefficient and the second coefficient is set to be zero when the load is zero.

13. An anti-skid control system in accordance with claim 11, wherein each of the first coefficient and the second coefficient is set to be 1 when the load is in excess of a predetermined value.

14. An anti-skid control system for use in an automotive vehicle having plural wheels comprising:
real slip rate detecting means for detecting a real slip rate of each of the wheels;
target slip rate setting means for setting a target slip rate of each of the wheels;
acceleration estimating means for setting an estimated acceleration of each of the wheels;
load measuring means for measuring a load applied to each of the wheels;
first correction means for obtaining a first corrected deviation by multiplying a first coefficient with a first deviation between the target slip rate and the real slip rate;
second correction means for obtaining a second corrected deviation by multiplying a second coefficient with a second deviation between a real acceleration and the estimated acceleration;
coefficient changing means for decreasing each of the first coefficient and the second coefficient as the load decreases; and
braking force control means for controlling a braking force of each of the wheels in such a manner that the real slip rate approaches the target slip rate, the control sensitivity of the braking force control means being dependent on the first corrected deviation and the second corrected deviation.

15. An anti-skid control system in accordance with claim 14, wherein each of the first coefficient and the second coefficient is set to be zero when the load is zero.

16. An anti-skid control system in accordance with claim 14, wherein each of the first coefficient and the second coefficient is set to be 1 when the load is in excess of a predetermined value.

17. An anti-skid control system for use in an automotive vehicle comprising:
real slip rate detecting means for detecting a real slip rate of the vehicle;
target slip rate setting means for setting a target slip rate of the vehicle;
real acceleration detecting means for detecting a real acceleration of the vehicle;

accelerating estimating means for setting an estimated acceleration of the vehicle;

load measuring means for measuring a load applied to the vehicle;

first correction means for obtaining a first corrected deviation by multiplying a first coefficient with a first deviation between the target slip rate and the real slip rate;

second correction means for obtaining a second corrected deviation by multiplying a second coefficient with a second deviation between the real acceleration and the estimated acceleration;

coefficient changing means for decreasing each of the first coefficient and the second coefficient as the load decreases; and braking force control means for controlling a braking force in such a manner that the real slip rate approaches the target slip rate, the control sensitivity of the braking force control means being set to be in malfunction based on the first corrected deviation and the second corrected deviation.

18. An anti-skid control system for use in an automotive vehicle having plural wheels comprising:

real slip rate detecting means for detecting a real slip rate of each of the wheels;

target slip rate setting means for setting a target slip rate of each of the wheels;

real acceleration detecting means for detecting a real acceleration of each of the wheels;

acceleration estimating means for setting an estimated acceleration of each of the wheels;

load measuring means for measuring a load applied to each of the wheels;

first correction means for obtaining a first corrected deviation by multiplying a first coefficient with a first deviation between the target slip rate and the real slip rate;

second correction means for obtaining a second corrected deviation by multiplying a second coefficient with a second deviation between the real acceleration and the estimated acceleration;

coefficient changing means for decreasing each of the first coefficient and the second coefficient as the load decreases; and braking force control means for controlling a braking force of each of the wheels in such a manner that the real slip rate approaches the target slip rate, the control sensitivity of the braking force control means being set to be in malfunction based on the first corrected deviation and the second corrected deviation.

19. An anti-skid control system for use in an automotive vehicle comprising:

real slip rate detecting means for detecting a real slip rate of the vehicle;

target slip rate setting means for setting a target slip rate of the vehicle;

real acceleration detecting means for detecting a real acceleration of the vehicle;

accelerating estimating means for setting an estimated acceleration of the vehicle;

load measuring means for measuring a load applied to the vehicle;

first correction means for obtaining a first corrected deviation by multiplying a first coefficient with a first deviation between the target slip rate and the real slip rate;

second correction means for obtaining a second corrected deviation by multiplying a second coefficient with a second deviation between the real acceleration and the estimated acceleration;

coefficient changing means for decreasing each of the first coefficient and the second coefficient as the load decreases; and braking force control means for controlling a braking force in such a manner that the real slip rate approaches the target slip rate, the control sensitivity of the braking force control means being set to be slowed down based on the first corrected deviation and the second corrected deviation.

20. An anti-skid control system for use in an automotive vehicle having plural wheels comprising:

real slip rate detecting means for detecting a real slip rate of each of the wheels;

target slip rate setting means for setting a target slip rate of each of the wheels;

real acceleration detecting means for detecting a real acceleration of each of the wheels;

acceleration estimating means for setting an estimated acceleration of each of the wheels;

load measuring means for measuring a load applied to each of the wheels;

first correction means for obtaining a first corrected deviation by multiplying a first coefficient with a first deviation between the target slip rate and the real slip rate;

second correction means for obtaining a second corrected deviation by multiplying a second coefficient with a second deviation between the real acceleration and the estimated acceleration;

coefficient changing means for decreasing each of the first coefficient and the second coefficient as the load decreases; and braking force control means for controlling a braking force of each of the wheels in such a manner that the real slip rate approaches the target slip rate, the control sensitivity of the braking force control means being set to be slowed down based on the first corrected deviation and the second corrected deviation.

* * * * *